(12) United States Patent
Moniz

(10) Patent No.: US 7,574,854 B2
(45) Date of Patent: Aug. 18, 2009

(54) GAS TURBINE ENGINE ASSEMBLY AND METHODS OF ASSEMBLING SAME

(75) Inventor: Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 457 days.

(21) Appl. No.: 11/327,610

(22) Filed: Jan. 6, 2006

(65) Prior Publication Data

US 2007/0157596 A1 Jul. 12, 2007

(51) Int. Cl.
*F02C 7/06* (2006.01)

(52) U.S. Cl. .............. 60/39.08; 415/170.1; 384/99; 384/474; 384/475; 384/537; 384/584

(58) Field of Classification Search ........... 60/39.08, 60/39.162, 226.1, 268, 792; 415/170.1; 384/99, 384/474, 475, 537, 584
See application file for complete search history.

(56) References Cited

U.S. PATENT DOCUMENTS

| | | | |
|---|---|---|---|
| 3,910,651 A * | 10/1975 | Pearce et al. ............ 384/99 |
| 4,214,796 A | 7/1980 | Monzel et al. |
| 4,378,197 A * | 3/1983 | Cattaneo et al. ......... 415/175 |
| 5,048,978 A | 9/1991 | Singh |
| 5,085,521 A | 2/1992 | Singh |
| 5,169,241 A | 12/1992 | Singh |
| 5,178,400 A | 1/1993 | Singh |
| 5,188,375 A | 2/1993 | Pope et al. |
| 5,197,807 A | 3/1993 | Kuznar |
| 5,201,585 A | 4/1993 | Gans et al. |
| 5,228,784 A | 7/1993 | Bobo |
| 5,251,985 A | 10/1993 | Monzel |
| 5,316,391 A | 5/1994 | Monzel |
| 5,320,134 A | 6/1994 | Singh |
| 5,344,239 A | 9/1994 | Stallone et al. |
| 5,813,214 A * | 9/1998 | Moniz et al. ............ 60/39.08 |
| 5,867,976 A * | 2/1999 | Ziegler, Jr. ............. 60/803 |
| 6,036,413 A * | 3/2000 | Chandrasekar ........... 409/231 |
| 6,135,639 A | 10/2000 | Dede |
| 2003/0097844 A1 * | 5/2003 | Seda ................. 60/791 |
| 2004/0062460 A1 * | 4/2004 | Dusserre-Telmon et al. . 384/475 |

* cited by examiner

*Primary Examiner*—Michael Cuff
*Assistant Examiner*—Phutthiwat Wongwian
(74) *Attorney, Agent, or Firm*—William Scott Andes, Esq.; Armstrong Teasdale LLP

(57) ABSTRACT

A method for assembling a gas turbine engine is provided. The method includes coupling a high-pressure compressor to a high-pressure turbine using a first shaft, coupling a fan assembly to a low-pressure turbine using a second shaft, and coupling a differential squeeze film damper assembly between the first and second shafts.

18 Claims, 3 Drawing Sheets

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a fan assembly, a core engine, and a power turbine coupled to the fan assembly. The core engine includes at least one compressor, a combustor, a high-pressure turbine coupled together in a serial flow relationship. More specifically, the compressor and high-pressure turbine are coupled through a shaft to define a high-pressure rotor assembly and the low-pressure turbine is coupled to the fan assembly utilizing a second shaft. Air entering the core engine is mixed with fuel and ignited to form a high energy gas stream. The high energy gas stream flows through the high-pressure turbine to rotatably drive the high-pressure turbine such that the shaft, in turn, rotatably drives the compressor.

To maximize the fuel burn in a high-performance turbine engine, it is desirable to utilize a high-bypass ratio fan that is coupled to a relative small core gas turbine engine. To reduce the engine cost, weight and complexity, at least one known gas turbine engine includes a differential bearing that is used to support the core spool from the low-pressure turbine spool. As a result, utilizing a known differential bearing in this application may result in relatively high differential bearing loads.

BRIEF DESCRIPTION OF THE INVENTION

In one embodiment, a method for assembling a gas turbine engine is provided. The method includes coupling a high-pressure compressor to a high-pressure turbine using a first shaft, coupling a fan assembly to a low-pressure turbine using a second shaft, and coupling a differential squeeze film damper assembly between the first and second shafts.

In another aspect, a differential squeeze film damper assembly is provided. The differential squeeze film damper assembly includes an inner race that is coupled to first shaft rotatable in a first direction, an outer race that is coupled to the second shaft rotatable in a second opposite direction, and a plurality of bearings coupled between the inner and outer races.

In a further aspect, a gas turbine engine assembly is provided. The gas turbine engine assembly includes a core gas turbine engine comprising a high-pressure compressor, a high-pressure turbine, and a first shaft coupled between the high-pressure compressor and the high-pressure turbine, a fan assembly coupled to the core gas turbine engine, a low-pressure turbine coupled to the core gas turbine engine, a second shaft coupled between the fan assembly and the low-pressure turbine, and a differential squeeze film damper bearing assembly coupled between the first shaft and the second shaft.

DETAILED DESCRIPTION OF THE INVENTION

Figure 1:
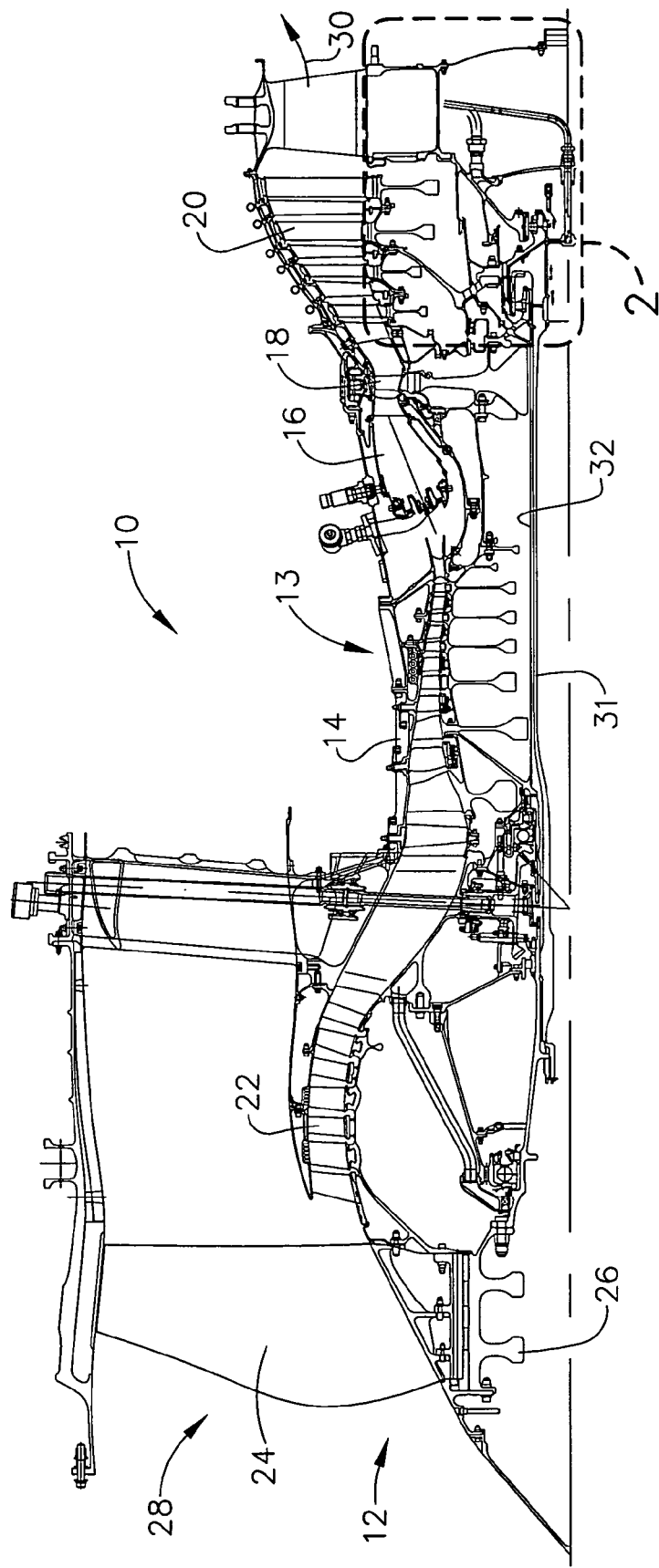
FIG. 1 is a cross-sectional view of a portion of an exemplary turbine engine assembly.

Referring to the drawings, FIG. 1 is a schematic illustration of a gas turbine engine 10 that includes a fan assembly 12 and a core engine 13 including a high-pressure compressor 14, a combustor 16, and a high-pressure turbine 18. Engine 10 also includes a low-pressure turbine 20, and a booster 22. Fan assembly 12 includes an array of fan blades 24 extending radially outward from a rotor disc 26. Engine 10 has an intake side 28 and an exhaust side 30. Fan assembly 12 and turbine 20 are coupled by a first rotor shaft 31, and compressor 14 and turbine 18 are coupled by a second rotor shaft 32.

During operation, air flows through fan assembly 12, along a central axis 34, and compressed air is supplied to high-pressure compressor 14. The highly compressed air is delivered to combustor 16. Airflow (not shown in FIG. 1) from combustor 16 drives turbines 18 and 20, and turbine 20 drives fan assembly 12 by way of shaft 31. In one embodiment, shaft 31 rotates in a first direction 40 and shaft 32 rotates in a second opposite direction 42. Optionally, shafts 31 and 32 each rotate in either the first direction 40 or the second direction 42.

Figure 2:
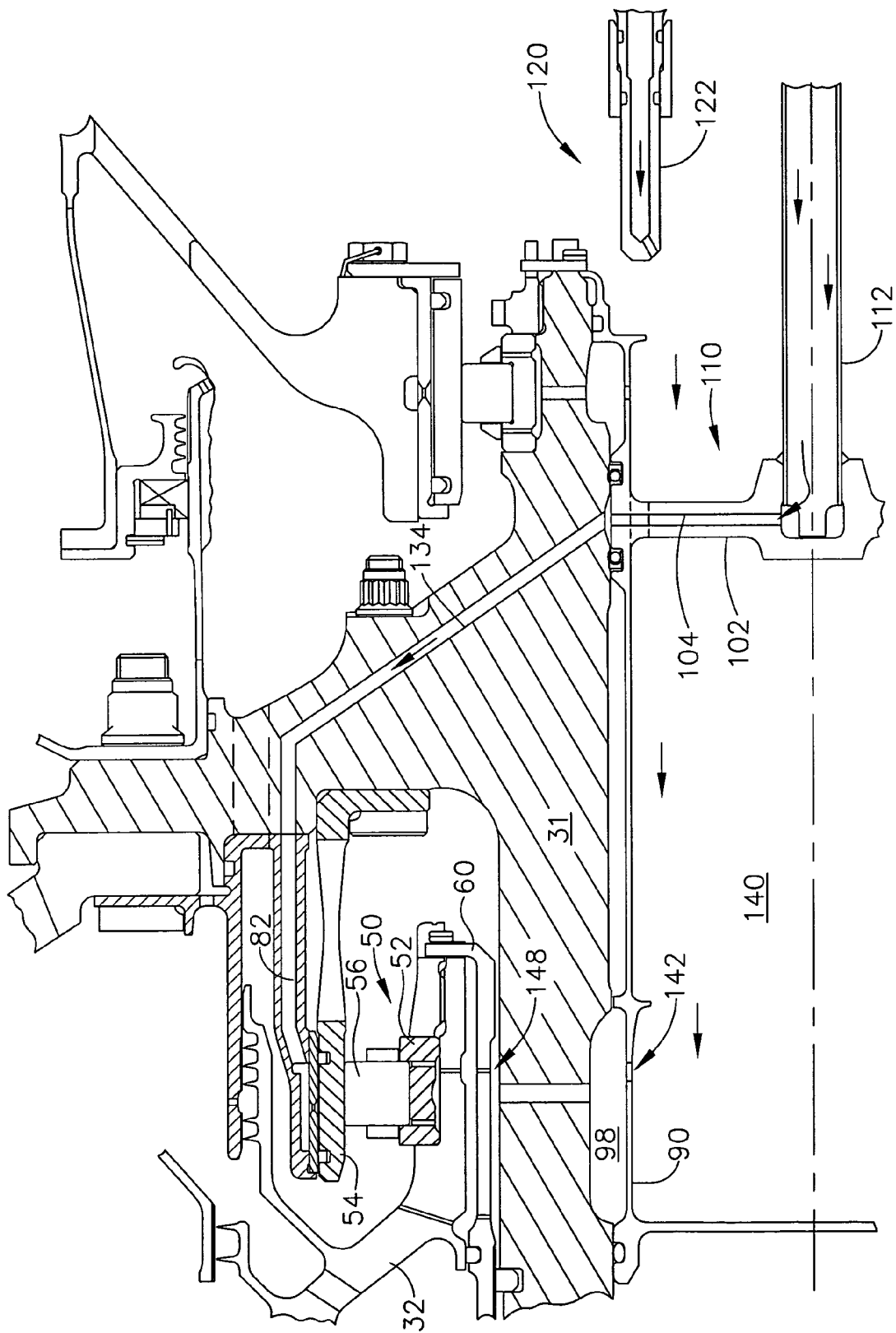
FIG. 2 is an enlarged cross-sectional view of a portion of the gas turbine engine assembly shown in FIG. 1 including a differential bearing assembly.
Figure 3:
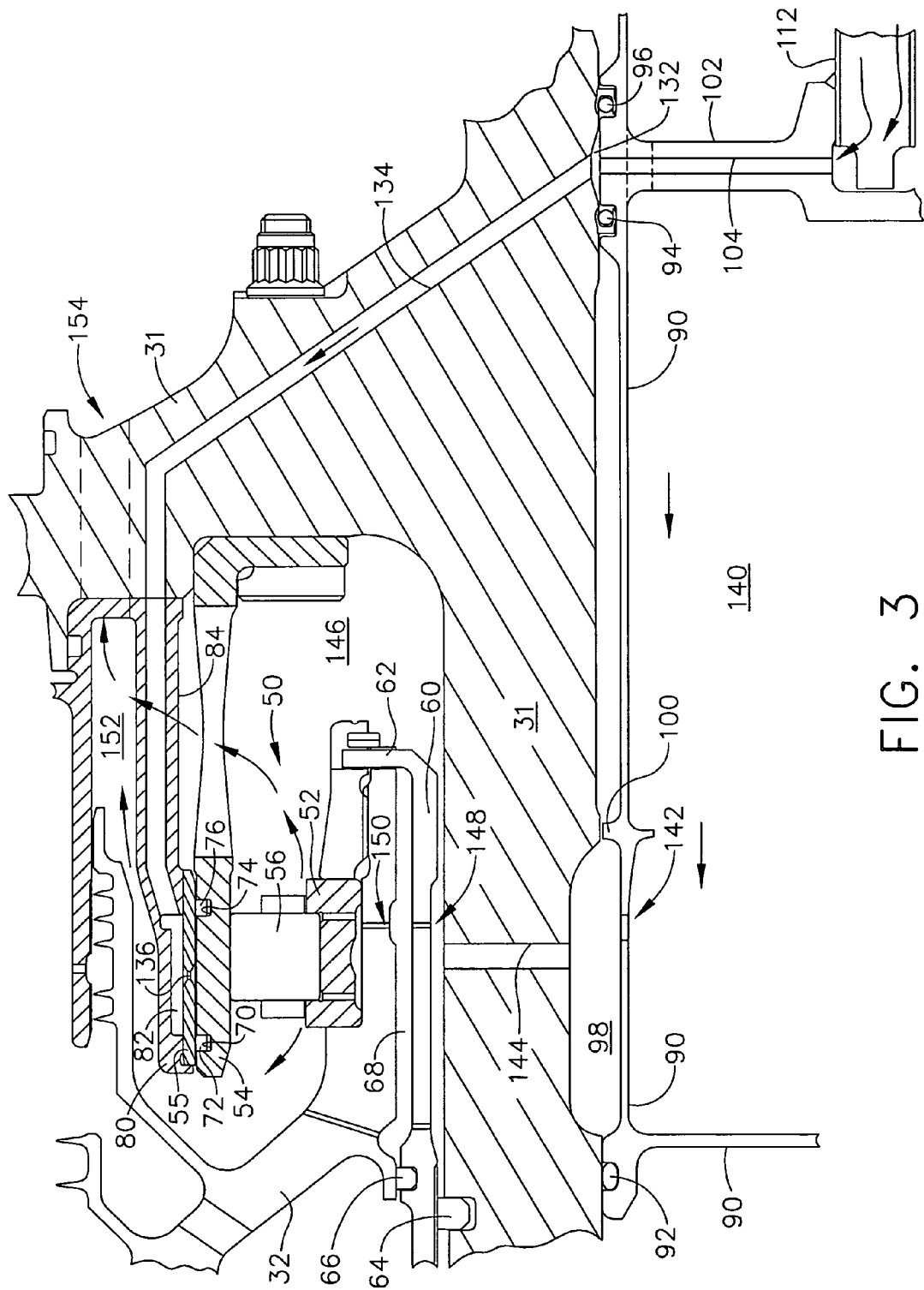
FIG. 3 is an enlarged cross-sectional view of the differential bearing assembly shown in FIG. 2.

FIG. 2 is a cross-sectional view of a portion of gas turbine engine 10 shown in FIG. 1 that includes an exemplary differential bearing assembly 50, i.e. an inter-shaft bearing that is coupled between two rotating shafts. FIG. 3 is an enlarged cross-sectional view of the differential bearing assembly 50 shown in FIG. 2. In the exemplary embodiment, differential bearing assembly 50 is coupled between first shaft 31 and second shaft 32. Although, the invention described herein is with respect to a single differential bearing 50, it should be realized that the invention described herein may also be utilized with a gas turbine engine that includes a plurality of differential bearings 50. Moreover, the invention described herein may also be utilized with a plurality of roller and/or ball bearing assemblies within gas turbine engine 10.

In the exemplary embodiment, differential bearing assembly 50 is a differential squeeze film damper bearing (DSFD) and includes a rotating radially inner race 52 that is secured to shaft 32 that extends between high-pressure turbine 18 and high-pressure compressor 14. Differential bearing assembly 50 also includes a rotating radially outer race 54 that is secured to shaft 31 via an outer race spring 55, and a plurality of bearings 56, i.e. rolling elements, that are positioned between inner and outer races 52 and 54 respectively. In the exemplary embodiment, bearings 56 are roller bearings. In an alternative embodiment, bearings 56 are ball bearings. In the exemplary embodiment, since inner race 52 is coupled to shaft 32 and outer race 54 is coupled to shaft 31, i.e. the shaft that extends between low-pressure turbine 20 and fan assembly 12, inner race 52 rotates in the first direction 40 and outer race 54 rotates in the opposite second direction 42.

Bearing assembly 50 also includes a seal lands 60 that is coupled at a first end 62 to shaft 32, a first seal 64 that is coupled radially inward of seal lands 60 such that a seal is defined between seal lands 60 and shaft 31, and a second seal 66 that is coupled radially outwardly of seal lands 60 such that a seal is defined between seal lands 60 and shaft 32. As such, a cavity 68 is defined between lands first end 62 and seal 66.

Bearing outer race 54 includes a first channel 70 that is sized to receive a piston seal 72 and a second channel 74 that is sized to receive a piston seal 76. More specifically, bearing outer race 54 is configured to move radially inwardly and radially outwardly such that seals 72 and 76 are in seal contact with shaft 31 during operation, as will be discussed below.

Gas turbine engine 10 also includes an oil distribution ring 80 that is coupled to shaft 31 and substantially circumscribes bearing assembly 50. In one embodiment, oil distribution ring 80 is coupled to shaft 31 and extends axially forward from shaft 31 such that a cavity 82 is defined between a radially inner surface of oil distribution ring 80 and a low-pressure turbine shaft extension 84 that extends axially forward of shaft 31. Optionally, oil distribution ring 80 is formed unitarily with shaft 31. A rotating oil cover 90 is provided to facilitate channeling a lubrication fluid to bearing assembly 50. Specifically, oil cover 90 is coupled radially inwardly from low-pressure turbine shaft 31 and includes a first seal 92 utilized to form a seal between the forward end of oil cover 90 and low-pressure turbine shaft 31, a second seal 94 that is axially aft of first seal 92, and a third seal 96 that is axially aft of second seal 94. In the exemplary embodiment, a first cavity 98 is defined between oil cover 90 and shaft 31. Specifically, first cavity 98 is bounded by oil cover 90, shaft 31, seal 92, and a projection 100 that extends radially outwardly from oil cover 90.

Oil cover 90 also includes an extension portion 102 that extends radially inwardly from oil cover 90 and includes an opening 104 defined therethrough. Gas turbine engine 10 also includes a pressure system 110 that is configured to channel a hydraulic fluid, such as a lubrication fluid, for example, to bearing assembly 50 to facilitate operating bearing assembly 50. Specifically, system 110 includes a supply manifold 112 that is coupled to a pump (not shown). Gas turbine engine 10 also includes a lubrication system 120 that is configured to lubricate bearing assembly 50. Lubrication system 120 includes a plurality of jets 122 that supply lubrication oil to bearing assembly 50.

During operation, high pressure hydraulic fluid to operate seal assembly 50 is channeled through manifold 112, through an opening 104 that extends through extension 102, and into a cavity 132. In the exemplary embodiment, cavity 132 is bounded by shaft 31, seal 94, seal 96, and rotating oil cover 90. Since it is under high pressure, the hydraulic fluid is forced radially outwardly through an opening 134 that is defined at least partially through shaft 31. Opening 134 defines a channel between cavity 132 and cavity 82 such that cavity 132 is in flow communication with cavity 82 and such that hydraulic fluid channeled from manifold 112 is supplied to bearing assembly 50. Specifically, the hydraulic fluid is channeled from cavity 82, and through at least one opening 136 such that the hydraulic fluid applies a mechanical force between the bearing outer race 54 and a separate damper ring 55. Additionally, the two piston rings 72, positioned in piston ring grooves 70 are located in the bearing outer race 54 to ensure that the rings 72 are forced out and seal against the damper ring 55 during engine operation at a predetermined engine rotational speed.

As a result of the above, the radial force components of any shaft imbalance is counteracted by the hydraulic force exerted on bearing assembly 50 by the hydraulic fluid maintained within cavity 82. As such, the reaction of the pressurized hydraulic fluid within the pressure regions, i.e. cavity 82, provide damping and stiffness between counter-rotating shafts 31 and 32.

During operation of lubrication system 120, lubrication fluid discharged from plurality of jets 122 is channeled into a cavity 140 that is defined radially inwardly from rotating oil cover 90. More specifically, since gas turbine engine 10 is rotating, the lubrication fluid is forced axially outwardly against rotating oil cover 90. The lubrication fluid is then channeled in a forward direction along the outer surface of oil cover 90 through an opening 142 that extends through oil cover 90 and into cavity 98. The lubrication fluid is then channeled through an opening 144 extending through shaft 31 into a cavity or sump 146 housing bearing assembly 50. A first portion of the lubrication fluid is channeled through an opening 148 extending through seal lands 60, and into cavity 68 that substantially circumscribes bearing assembly 50. The oil is then channeled from cavity 68 through an opening 150 that extends through shaft 32 to facilitate lubricating bearing assembly 50. After lubricating bearing assembly 50, the lubrication fluid is discharged into a cavity 152 that substantially circumscribes oil distribution ring 80. The lubrication fluid is then discharged from the cavity 152, through an opening 154 formed through shaft 31, and back to the lubrication scavenge system (not shown).

Described herein is a gas turbine engine that includes a differential squeeze film damper bearing assembly that is coupled between two rotating shafts in the gas turbine engine. The bearing assembly includes an outer race that attaches to and rotates with the low-pressure turbine spool and an inner race that attaches to and rotates with the high-pressure turbine. In the exemplary embodiment, the inner and outer races rotate in opposite directions. Optionally, the inner and outer races rotate in the same direction.

During operation, the bearing assembly including a soft spring attachment, facilitates increasing damping and stiffness between the counter-rotating shafts. Specifically, the squeeze film damper bearing assembly is located radially outwardly from the bearing assembly outer race which rotates at the slower low-pressure turbine speed. Hydraulic oil is provided from the aft sump cover, across rotating, i.e. dynamic, oil seals to a center oiling tube. The center oiling tube channels the hydraulic oil forward to the distribution ring positioned inside the low-pressure turbine shaft. Seals between the distribution ring and the low-pressure turbine shaft enable oil pressure to be maintained as it crosses the boundary. The hydraulic oil is then channeled through opening in the low-pressure turbine shaft. In the exemplary embodiment, the openings are located at the aft side of the low-pressure turbine shaft where the transition from cylinder to flange occurs. This is typically a lower stress location of the low-pressure turbine shaft. The hydraulic oil exits on the forward side of the low-pressure turbine shaft and proceeds forward through a cover to the squeeze film damper bearing assembly that includes a separate damper ring and two piston rings for sealing. The piston ring grooves are located in the bearing outer race to ensure that sealing occurs at speed. During operation, the rings are forced out and seal against the damper ring.

Additionally, the gas turbine engine includes a lubrication supply system that includes a plurality of jets configured to channel lubrication fluid along the rotating oil cover to the differential bearing assembly.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
coupling a fan assembly to a low-pressure turbine using a first shaft;
coupling a high-pressure compressor to a high-pressure turbine using a second shaft; and coupling a differential squeeze film damper bearing assembly between the first and second shafts, wherein the differential squeeze film damper bearing assembly includes an inner race, an outer race, and at least one bearing coupled between the inner race and the outer race, the outer race secured to the first shaft via an outer race spring, the outer race including at least a first groove configured to receive a first seal, the first seal configured to facilitate sealing between the outer race spring and the outer race during engine operation.

2. A method in accordance with claim 1 further comprising coupling the fan assembly to the low-pressure turbine using the first shaft, which rotates in an opposite direction than the second shaft.

3. A method in accordance with claim 1 method further comprising:
    coupling the inner race to the second shaft such that the inner race rotates in the same direction as the high-pressure turbine; and
    coupling the outer race to the first shaft such that the outer race rotates in a second opposite direction.

4. A method in accordance with claim 1 further comprising coupling a hydraulic system to the gas turbine engine such that a hydraulic fluid is channeled through the first shaft to operate the differential squeeze film damper bearing assembly.

5. A method in accordance with claim 1 further comprising coupling a lubrication system to the gas turbine engine such that a lubrication fluid is channeled through the first shaft to facilitate lubricating the differential squeeze film damper bearing assembly.

6. A method in accordance with claim 5 wherein coupling a lubrication system to the gas turbine engine further comprises:
    coupling a rotating oil cover to the first shaft such that a cavity is defined between the first shaft and the rotating oil cover; and
    forming at least one opening through the first shaft such that the at least one opening is in flow communication with said cavity and such that oil channeled through the at least one opening facilitates lubricating the differential squeeze film damper bearing assembly.

7. A differential squeeze film damper bearing assembly for a gas turbine engine that includes a fan assembly, a low-pressure turbine, and a first shaft coupled between the fan assembly and the low-pressure turbine, a high-pressure compressor, a high-pressure turbine, and a second shaft coupled between the high-pressure compressor and the high-pressure turbine; said differential squeeze film damper bearing assembly comprising:
    an outer race coupled to said first shaft via an outer race spring, said first shaft rotatable in a first direction, said outer race comprising at least a first groove configured to receive a first seal, said first seal configured to facilitate sealing between said outer race spring and said outer race during engine operation; an inner race coupled to said second shaft rotatable in a second opposite direction; and at least one bearing coupled between said inner and outer races.

8. A differential squeeze film damper bearing assembly in accordance with claim 7 wherein said outer race further comprises a second groove configured to receive a second seal.

9. A differential squeeze film damper bearing assembly in accordance with claim 8 wherein said first and second seals are configured to facilitate sealing between said outer race spring and said bearing outer race during engine operation.

10. A gas turbine engine assembly comprising:
    a fan assembly coupled to a core gas turbine engine;
    a low-pressure turbine coupled to said core gas turbine engine;
    a first shaft coupled between said fan assembly and said low-pressure turbine; said core gas turbine engine comprising a high-pressure compressor, a high-pressure turbine, and a second shaft coupled between said high-pressure compressor and said high-pressure turbine; and
    a differential squeeze film damper bearing assembly coupled between said first shaft and said second shaft, wherein said differential squeeze film damper bearing assembly comprises an inner race, an outer race, and at least one bearing coupled between said inner race and said outer race, said outer race coupled to said first shaft via an outer race spring, said outer race comprising at least a first groove configured to receive a first seal, said first seal configured to facilitate sealing between said outer race spring and said outer race during engine operation.

11. A gas turbine engine assembly in accordance with claim 10 wherein said first shaft rotates in a first direction and said second shaft rotates in an opposite second direction.

12. A gas turbine engine in accordance with claim 10 wherein said inner race is coupled to said second shaft.

13. A gas turbine engine in accordance with claim 11 wherein said outer race further comprises a second groove configured to receive a second seal.

14. A gas turbine engine in accordance with claim 13 wherein said first and second seals are configured to facilitate sealing between said outer race spring and said bearing outer race during engine operation.

15. A gas turbine engine in accordance with claim 10 further comprising:
    a lubrication system coupled to said gas turbine engine such that a lubrication fluid is channeled through said second shaft to lubricate said differential squeeze film damper bearing assembly.

16. A gas turbine engine assembly in accordance with claim 10 further comprising:
    seal lands coupled to said second shaft; and
    a seal coupled between said seal lands and said second shaft such that a first cavity is defined between said seal lands, said second shaft, and said seal, said first cavity in flow communication with said lubrication system.

17. A gas turbine engine assembly in accordance with claim 15 further comprising:
    an oil cover coupled to said first shaft such that a second cavity is defined between said oil cover and said first shaft, said oil cover configured to rotate with said first shaft, said lubrication system configured to channel lubrication fluid through an opening extending through said oil cover into said second cavity, said first shaft comprising an opening extending therethrough such that said first cavity is in flow communication with said second cavity.

18. A gas turbine engine in accordance with claim 10 further comprising:
    an oil distribution ring that is coupled to said first shaft and substantially circumscribes said differential squeeze film damper bearing assembly such that a third cavity is defined between said oil distribution ring and said differential squeeze film damper bearing assembly; and
    a hydraulic fluid supply system configured to channel hydraulic fluid through an opening extending through the first shaft into said third cavity to facilitate pressurizing said differential squeeze film damper bearing assembly.

* * * * *

UNITED STATES PATENT AND TRADEMARK OFFICE
CERTIFICATE OF CORRECTION

PATENT NO. : 7,574,854 B2 Page 1 of 1
APPLICATION NO. : 11/327610
DATED : August 18, 2009
INVENTOR(S) : Thomas Ory Moniz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 681 days.

Signed and Sealed this

Seventh Day of September, 2010

David J. Kappos
*Director of the United States Patent and Trademark Office*